United States Patent [19]
Yamashita

[11] Patent Number: 5,848,362
[45] Date of Patent: Dec. 8, 1998

[54] PORTABLE ALERTING UNIT FOR ALERTING A USER TO CALL ARRIVAL TO PORTABLE RADIO APPARATUS

[75] Inventor: Osamu Yamashita, Tokyo, Japan

[73] Assignee: NEC Corporation, Tokyo, Japan

[21] Appl. No.: 409,165

[22] Filed: Mar. 23, 1995

[30] Foreign Application Priority Data

Mar. 25, 1994 [JP] Japan ................................ 6-077889

[51] Int. Cl.$^6$ ............................................. H04G 7/32
[52] U.S. Cl. ................................ 455/567; 455/227
[58] Field of Search ............................ 455/66, 89, 90, 455/95, 96, 99, 100, 345, 351, 161.1, 161.2, 228, 426, 343, 38.3, 67.1, 67.7, 227, 567; 379/57, 58; 340/825.44, 311.1

[56] References Cited

U.S. PATENT DOCUMENTS

| | | | |
|---|---|---|---|
| 4,801,925 | 1/1989 | Davis | 455/100 |
| 5,117,449 | 5/1992 | Metroka et al. | 379/58 |
| 5,151,694 | 9/1992 | Yamasaki . | |
| 5,247,700 | 9/1993 | Wohl et al. | 455/228 |
| 5,404,391 | 4/1995 | Wavrofh | 455/567 |
| 5,651,052 | 7/1997 | Serrano | 455/567 |

FOREIGN PATENT DOCUMENTS

| | | | |
|---|---|---|---|
| 0 263 666 | 4/1988 | European Pat. Off. . | |
| 0285030 | 11/1988 | Japan | 455/11.1 |
| 2-186863 | 7/1990 | Japan . | |
| WO91/14332 | 9/1991 | WIPO . | |

OTHER PUBLICATIONS

Patent Abstracts of Japan, vol. 17, No. 110 (E–1329) & JP–A–04 293339.
Patent Abstracts of Japan, vol. 15, No. 246 (E–1081) & JP–A–03 078348.
Patent Abstracts of Japan, vol. 14, No. 259 (E–0937) & JP–A–02 079545.
Patent Abstracts of Japan, vol. 13, No. 18 (E–704) & JP–A–63 224422.

*Primary Examiner*—Edward F. Urban
*Attorney, Agent, or Firm*—Scully, Scott, Murphy & Presser

[57] ABSTRACT

A synthesizer varies the receive frequency band so that a receiver can receive signals in the receive frequency band of the uplink incoming call channel of a portable telephone. A receiver demodulates, from a receive signal entered via an antenna, the incoming call response signal of a portable telephone connected by radio to a base station. A comparator detects, from the incoming call response signal, the portable telephone's own ID number or telephone number stored in a memory. The memory consists of an EEPROM. An alerting section, in response to the detection of the portable telephone's own ID number or telephone number, performs call operation. The alerting section is provided with a loudspeaker for emitting an alerting sound, an LED for intermittently emitting light and a vibrator for generating vibration. A call operation select button selects the setting or resetting of the loudspeaker, the LED and the vibrator. The call operation stop button stops call operation. The portable alerting unit may detect either the ID number or the telephone number of the portable telephone out of the incoming call signal from the base station.

19 Claims, 6 Drawing Sheets

PORTABLE ALERTING UNIT FOR ALERTING A USER TO CALL ARRIVAL TO PORTABLE RADIO APPARATUS

BACKGROUND OF THE INVENTION

The present invention relates to an alerting unit, and more particularly to a portable alerting unit for alerting a user to a call arrival to a portable radio apparatus.

A portable radio apparatus according to the prior art, for instance a portable telephone, upon detection of a call arrival, emits an alerting sound from a loudspeaker. The user of the portable telephone, in response to the alerting sound, operates its off-hook button and then starts answering the call.

The portable telephone, besides or instead of emitting an alerting sound, can also generate vibration from a vibrator and/or intermittent light from an LED.

However, if the user of the portable telephone is carrying it in, for instance, a bag, he will be unable to recognize the alerting sound from the loudspeaker, the vibration from the vibrator or the intermittent light from the LED, and accordingly cannot operate the off-hook button to start answering the call.

Among means worked out to solve the above-mentioned problem, there is one disclosed on Jul. 23, 1990 in the Japan Patent Application Laid-Open Heisei 2-186863 (hereinafter referred to as Reference 1). Reference 1 disclosed an accessory calling unit to be electrically connected by a signal line to a portable mobile telephone. The accessory calling unit has an incoming call detecting section, which is connected by the signal line to a speech control section in the portable mobile telephone apparatus.

Upon detection of a call arrival by the portable mobile telephone, the speech control section supplies a call arrival signal to the incoming call detecting section of the accessory calling unit via the signal line. The accessory calling unit, in response to the incoming call signal, emits an alert sound from a loudspeaker. Besides emitting the alert sound from the loudspeaker, the accessory calling unit generates vibration from a vibrator and emits light dots from an LED.

As the accessory calling unit is a small portable item, the user of the portable mobile telephone can carry it in, for instance, a pocket of his coat. Because of this convenient portability of the accessory calling unit, the user of the portable telephone can always carry it with him, and accordingly can promptly respond to an alerting sound emitted from the accessory calling unit. The user of the portable mobile telephohe, in response to the alerting sound, operates the off-hook button of the portable telephone and starts answering the call.

Reference 1 further states that "the incoming call signal can also be transmitted between the speech control section and the incoming call detecting section via a radio signal line as the signal line". Although no specific example of this possibility is disclosed, judging from the description, there seems to be a need to provide within the portable telephone unit a transmitter and an antenna for transmitting the incoming call signal from the speech control section to the incoming call detecting section.

Transmission by radio, compared with transmission over a wire, has the advantage of being unrestricted, because of the absence of wire, in distance between the accessory calling unit and the portable mobile telephone or in the position in which the accessory calling unit is to be carried. However, according to Reference 1, there have to be additionally installed an antenna and a transmitter for transmitting the incoming call signal to the accessory calling unit within the telephone apparatus besides the usual antenna and transmitter. Moreover, control for transferring the incoming call signal should be added to usual control.

SUMMARY OF THE INVENTION

An object of the present invention, therefore, is to provide a portable alerting unit for alerting a user to a call arrival to a portable radio apparatus without having to add any function or element to the portable radio apparatus.

Another object of the invention is to provide a portable alerting unit for alerting a user to a call arrival to the portable radio apparatus by detecting an incoming call response signal from the portable radio apparatus.

A still another object of the invention is to provide a portable alerting unit for informing a user of a call arrival to the portable radio apparatus by detecting the ID number of the portable radio apparatus contained in the incoming call response signal from the portable radio apparatus.

A further object of the invention is to provide a portable alerting unit for alerting a user to a call arrival to the portable radio apparatus by detecting the radio number of the portable radio apparatus contained in the incoming call response signal from the portable radio apparatus.

A still further object of the invention is to provide a portable alerting unit for alerting an operator to a call arrival to the portable radio apparatus by detecting an incoming call signal from a radio base station and further detecting the ID number or the radio number of the portable radio apparatus contained in this incoming call signal.

In order to achieve the aforementioned objects, a portable alerting unit according to the invention is provided with a detecting section for detecting a incoming call response signal from a portable radio apparatus and an alerting section, responsive to this detection, for performing call operation. The portable alerting unit is further provided with an antenna and a synthesizer for varying the frequency band of received signals. The synthesizer scans the frequency band of the received signals at regular time intervals so that the antenna can receive in a frequency band in which the portable radio apparatus can transmit its incoming call response signal.

The detecting section is further provided with a receiver for demodulating a received signal and supplying a demodulated signal; a memory for storing the portable radio apparatus's own ID number or radio number; and a controller for detecting the portable radio apparatus's own ID number or radio number contained in the demodulated signal. The memory includes an electrically erasable programmable read only memory (EEPROM). The alerting section includes a loudspeaker, an LED and a vibrator. The portable alerting unit is provided with a selector for setting or resetting the loudspeaker, the LED and the vibrator.

Alternatively, the portable alerting unit may detect the portable telephone's own ID number or radio number contained in an incoming call signal from a base station, instead of an incoming call response signal from the portable telephone, and perform call operation.

By adopting the above-summarized configuration, the portable alerting unit according to the present invention detects an incoming call to a portable telephone by detecting the portable telephone's own ID number or radio number contained either in an incoming call response signal from the portable telephone or in an incoming call signal from a base station.

BRIEF DESCRIPTION OF THE DRAWINGS

The above-mentioned and other objects, features and advantages of the invention will become more apparent from the following detailed description when taken in conjunction with the accompanying drawings, wherein.

DETAILED DESCRIPTION OF THE PREFERRED EMBODIMENTS

Figure 1:
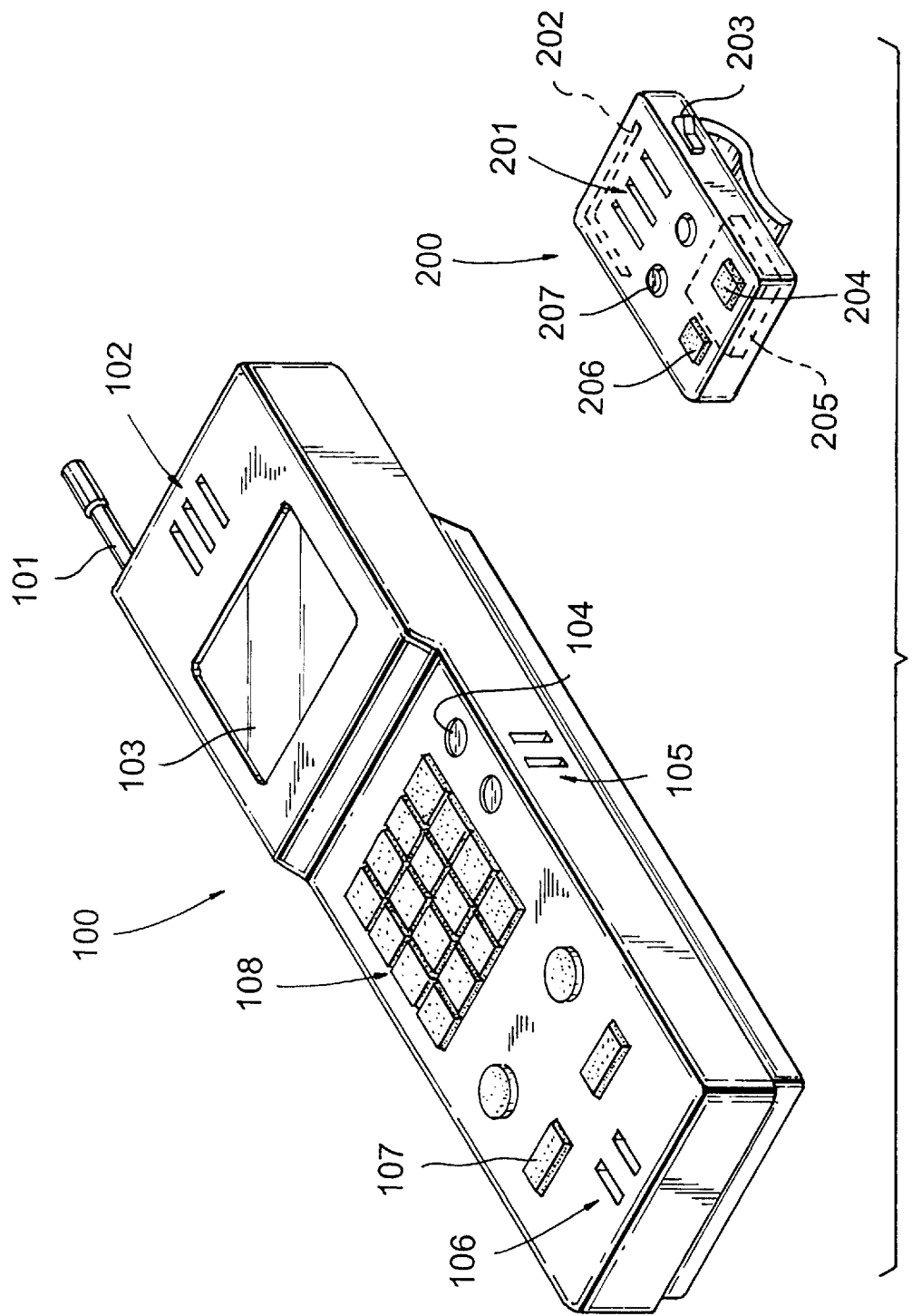
FIG. 1 illustrates in perspective an example of portable telephone to be used in connection with the invention and a portable alerting unit, which is a preferred embodiment of the invention.

In FIG. 1, a portable telephone 100 is provided with a telescopic antenna 101. A receiver section 102 emits the speech signal from the calling party. A display section 103 indicates, for instance, the day of the month, the day of the week and the time of the day. An LED 104 intermittently emits light when the portable telephone 100 has detected the arrival of an incoming call. A loudspeaker 105 emits an alerting sound when the portable telephone 100 has detected the arrival of the incoming call. A microphone section 106 supplies a speech of the user of the portable telephone 100 to a controller 112 to be described below. An off-hook button 107 is operated by the user when the LED 104 is intermittently emitting light or the loudspeaker 105 is emitting the alerting sound. 10-key buttons 108 are operated by the user when the telephone number of the other party is to be dialed.

A portable alerting unit 200 is a small radio apparatus embodying consideration for the carrying ease of the user of the portable telephone 100. When the portable alerting unit 200 detects the ID number of the portable telephone 100 contained in an incoming call response signal from the portable telephone 100, a loudspeaker 201 emits an alerting sound. An antenna 202 is built into the portable alerting unit 200. A power switch 203 is to be operated by the user for on/off control of the portable alerting unit 200. When the portable alerting unit 200 detects the ID number of the portable telephone 100 contained in the incoming call response signal from the portable telephone 100, a vibrator 205 generates vibration. When the portable alerting unit 200 detects the ID number of the portable telephone 100 contained in the incoming call response signal from the portable telephone 100, an LED 207 intermittently emits light. A stop button 204 is for stopping the alerting sound emitted by the loudspeaker 201, the vibration generated by the vibrator 205 and the intermittent lighting of the LED 207. A call operation select button 206 selects the setting or resetting of the loudspeaker 201, the vibrator 205 and the LED 207 which are actuated when the portable alerting unit 200 detects the ID number of the portable telephone 100. The LED 207 intermittently emits light when the portable alerting unit 200 has detected the ID number of the portable telephone 100 contained in the incoming call response signal from the portable telephone 100.

Figure 2:
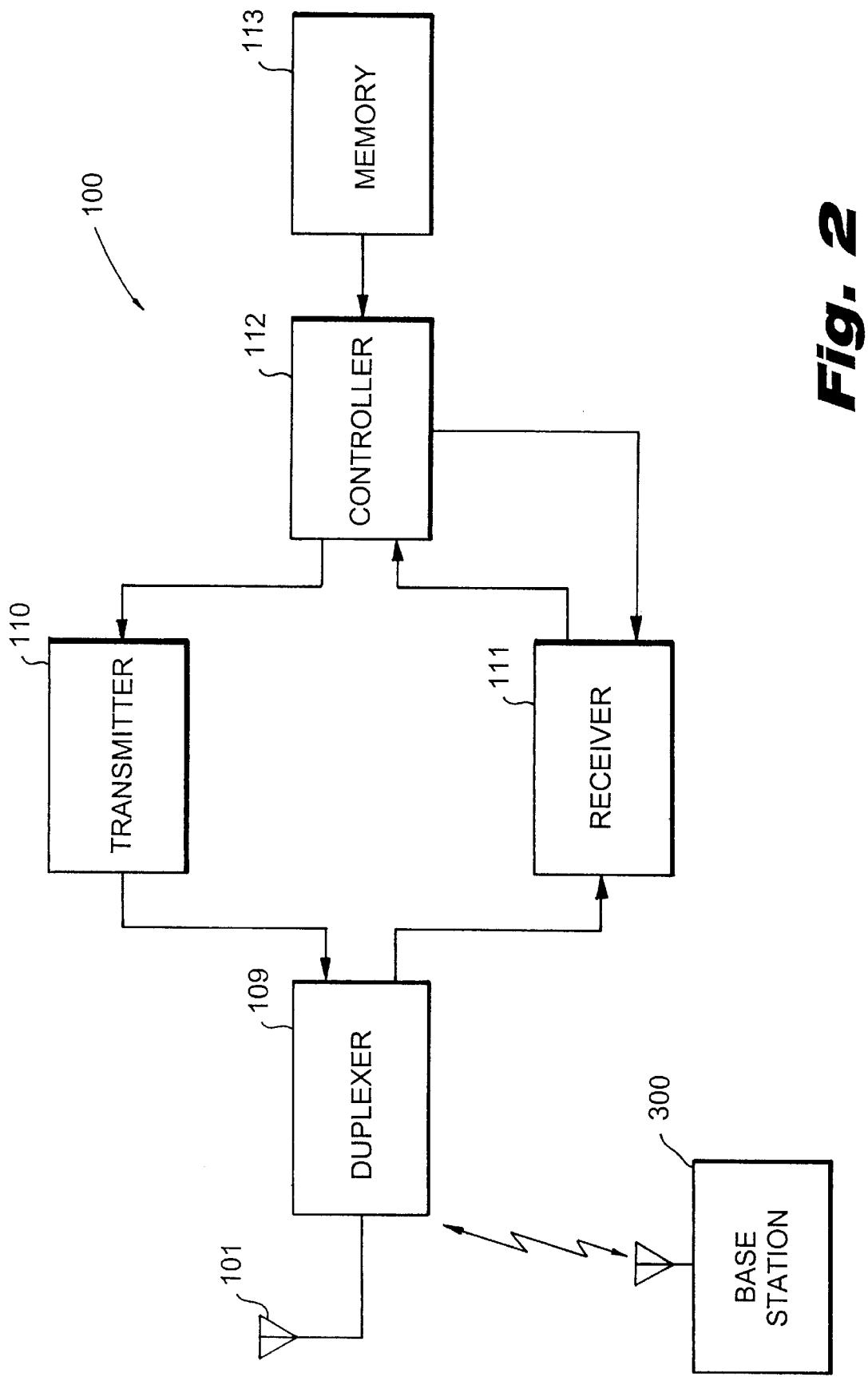
FIG. 2 is a functional block diagram of the portable telephone shown in FIG. 1.

In FIG. 2, the antenna 101, connected to a base station 300 via a radio line, receives a received signal and transmits a transmitting signal. A duplexer 109 supplies the received signal to a receiver 111 and the transmitting signal to the antenna 101. A transmitter 110 modulates the incoming call response signal from the controller 112 to generate the transmitting signal and supplies the transmitting signal to the duplexer 109. The receiver 111 demodulates the received signal to generate an incoming call signal, and supplies the incoming call signal to the controller 112. The receiver 111, as will be described below, detects the electrical field intensity of the received signal at the request of the controller 112, and supplies a electrical field detection signal to the controller 112.

The controller 112 detects coincidence between the ID number of a portable telephone contained in the incoming call signal and the ID number of the portable telephone it belongs to, stored in a memory 113, if they are identical. The controller 112, upon detection of the coincidence of the ID number, requests the receiver 110 to detect the electrical field intensity of the receive signal. The controller 112, as will be described below, supplies an incoming call response signal to the transmitter 110 upon entry of a electrical field detection signal.

Incidentally, though the portable telephone 100 has constituent elements including the receiver section 102 and the display section 103 as illustrated in FIG. 1, they are not referred to in the functional block diagram of FIG. 2 because they have no particular relevance to this embodiment.

Figure 3:
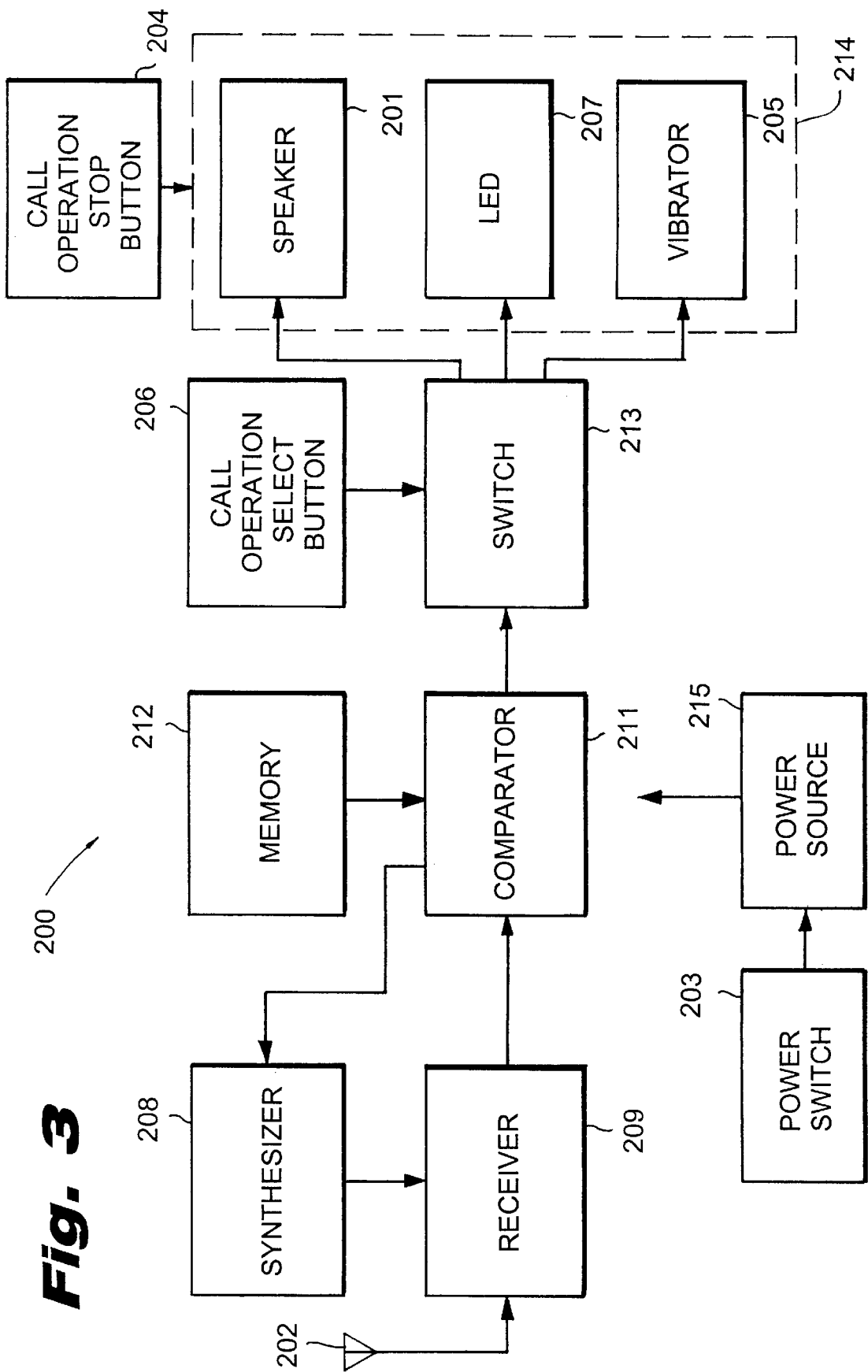
FIG. 3 is a functional block diagram of the portable alerting unit shown in FIG. 1.

In FIG. 3, the antenna 202 receives signals in the frequency band allocated for the uplink among the incoming call channels of the portable telephone 100. A synthesizer 208 sets the frequency band of received signals to be received by a receiver 209 under control by the controller (not shown) of a comparator 211. The receiver 209 receives transmitting signals from the portable telephone 100 as received signals, and demodulates the received signals to re-generate the incoming call response signal. The receiver 209 supplies the incoming call response signal to the comparator 211.

The comparator 211 checks whether or not the ID number of the portable telephone 100, stored in a memory 212, is contained in the incoming call response signal. The comparator 211, if it detects the ID number of the portable telephone 100, supplies an alert signal.

The call operation select button 206 supplies a switch 213 with a call operation select signal for selecting the setting or resetting of the loudspeaker 201, the LED 207 and the vibrator 205 which constitute an alerting section 214. The switch 213 supplies the alert signal from the comparator 211 to the alerting section 214, which is set by the call operation select signal. The loudspeaker 201, which constitutes a part of the alerting section 214 generates an alert sound, the vibrator 205 generates vibration and the LED 207 intermittently emits light, in order to achieve call operation. A call operation stop button 204 is used to stop the call operation by the alerting section 214.

The power switch 203 is operated by the user of the portable telephone 100 to supply a power control signal requesting to turn the power on or off. A power source 215, in response to the power control signal, executes the turning on/off of power supply to each section.

Figure 4:
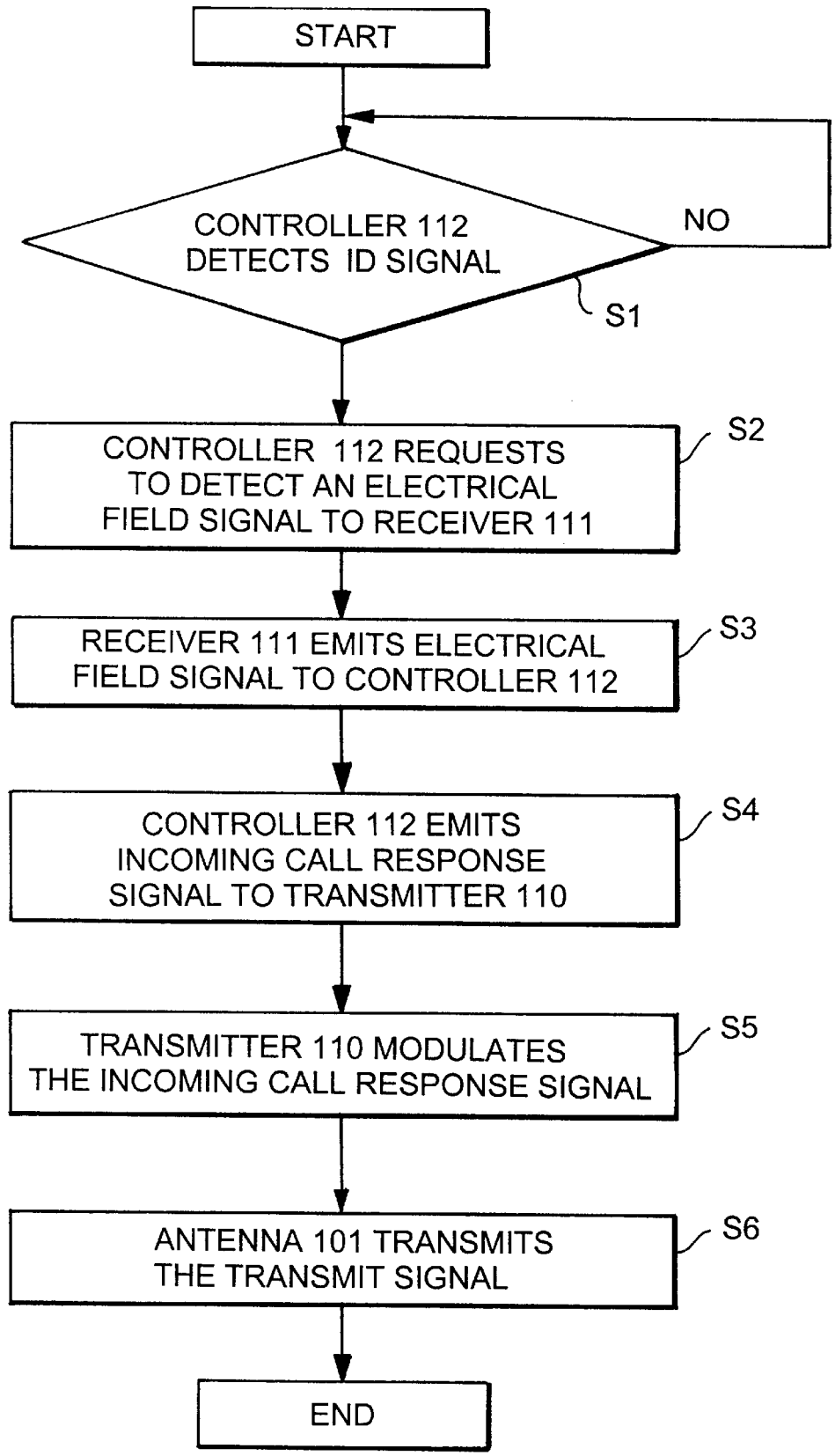
FIG. 4 is a flow chart for describing the function of the portable telephone shown in FIG. 1 to respond to an incoming call.

Referring to FIG. 4, the portable telephone 100 is connected by radio to base stations in the service area to which it belongs. For each base station, a pair of incoming call channels, uplink and downlink, are set. The controller 112 controls the receiver 111 so that the antenna 101 can receive the frequency band of the downlink incoming call channel from the base station to which the portable telephone 100 is connected.

The controller 112 enters the incoming call signal via the antenna 101 and the receiver 111 to detect the ID number of the portable telephone it belongs to (S1). The controller 112, after detecting the ID number, requests the receiver 111 to detect the electrical field intensity of the receive signal (S2). The receiver 111, in response to the request from the controller 112 to detect the electrical field intensity, detects the electrical field intensity of the receive signal on the downlink incoming call channel allocated to each base station, and supplies an electrical field detection signal (S3). Incidentally, the detection of the electrical field intensity of the received signal by the receiver 111 means that the receiver 111 changes the frequency band of received signals to be received by the antenna 101. Thus, as the portable telephone 100 is connected by radio to the base station which transmits receive signals of the highest electrical field intensity, the controller 112 changes the frequency band of receive signals, to be received by the antenna 101, on the downlink incoming call channels of base stations neighboring the base station to which the portable telephone 100 is currently connected so as to enable the antenna 101 to receive them. The receiver 111, according to the change in the frequency band of receive signals, successively detects the electrical field intensities of the downlink incoming call channels from the base stations neighboring the base station to which the portable telephone 100 is currently connected. The receiver 111 supplies the electrical field signal indicating the base station transmitting on the incoming call channel on which the highest electrical field intensity has been detected.

The controller 112, into which the electrical field detection signal is entered, generates the incoming call response signal to be described in further detail below (S4). The transmitter 110, into which the incoming call response signal is supplied, modulates it to generate a transmitting signal (S5). The antenna 101 is supplied the transmitting signals via the duplexer 109 from the transmitter 110 and transmitts the transmitting signal to the base station to which the portable telephone is currently connected by radio (S6).

After the transmission of the transmitting signal from the antenna 101, the portable telephone 100 performs, for instance, the switching of the radio-connected base station and the setting of the speech channel. However, as the operations of the portable telephone 100 after the transmission of the transmitting signal from the antenna 101 have no direct relevance to this embodiment, description of these operations is dispensed with here.

Figure 5:
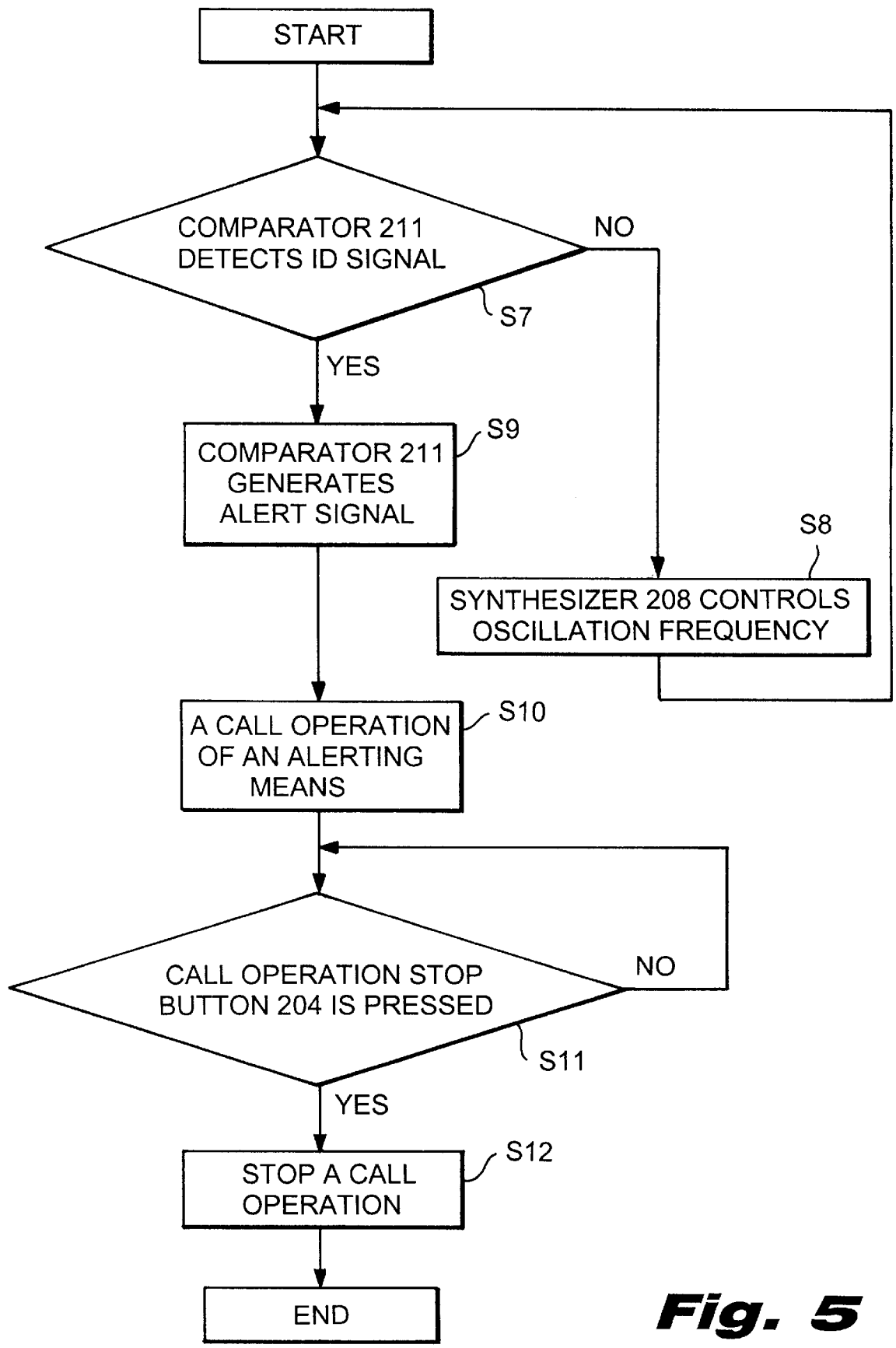
FIG. 5 is a flow chart for describing the function of the portable alerting unit shown in FIG. 1 to perform call operation.

Referring now to FIG. 5, after the power source is supplied the synthesizer 208 sets the frequency band of the receiver 209 so that, the antenna 202 can receive signals in the frequency band of the uplink incoming call channel used by the portable telephone 100.

Incidentally, regarding this embodiment, the transmitting/received signals of the portable telephone 100 will be described in conformity with the standard of the United King-dom Total Access Communication System (hereinafter abbreviated to TACS) Mobile Station-Land Station Compatibility Specification Issue 4 published in August 1989. In TACS, 20 incoming call channels are set.

The comparator 211, into which the incoming call response signal is supplied via the antenna 202 and the receiver 209, checks whether or not the signal contains the ID number of the portable telephone 100 to which it belongs (S7). If the ID number is not contained, a controller (not shown) in the comparator 211 will control the oscillation frequency of the synthesizer 208 as will be described below.

Here are described cases in which the comparator 211 fails to detect the ID number of the portable telephone 100.

In a first such case, the receiving frequency band of the antenna 202 currently set by the receiver 209 differs from the uplink incoming call channel of the portable telephone 100, because the portable alerting unit 200 cannot detect the base station connected by radio to the portable telephone 100. In other words, the portable alerting unit 200 cannot detect the frequency band of the uplink incoming call channel currently used by the portable telephone 100. Therefore, where the ID number is not detected, the synthesizer 208 should control the receiver 209 at regular time intervals to change the receiving frequency band of the antenna 202.

In a second such case, though the receiving frequency band of the antenna 202 currently set by the receiver 209 fits the uplink incoming call channel of the portable telephone 100, the portable telephone 100 is transmitting no incoming call response signal containing its own ID number. In this case, too, the oscillation frequency of the synthesizer 208 is controlled.

After a certain period of time, as the synthesizer 208 varies the receiving frequency band of the antenna 202 to change the uplink incoming call channel on which the antenna 202 receives signals (S8), the comparator 211 checks whether or not the incoming call response signal received on this channel contains the ID number of the portable telephone 100 to which it belongs (S7).

The portable alerting unit 200 continues the aforementioned operation until the ID number of the portable telephone 100 is detected.

Upon detection of the ID number of the portable telephone 100 by the comparator 211 from an incoming call response signal, an alert signal is generated (S9). The comparator 211 supplies the alert signal to the alerting means of the alerting section 214 selected by the call operation select button 206, and the selected alerting means performs call operation (S10). This call operation is the emission of an alerting sound when the loudspeaker 201 is set for operation, intermittent lighting when the LED 207 is set, or vibration when the vibrator 205 is set. When the user of the portable alerting unit notices the call operation and presses the call operation stop button 204 (S11), the alerting section 214 stops the call operation (S12).

Figure 6:
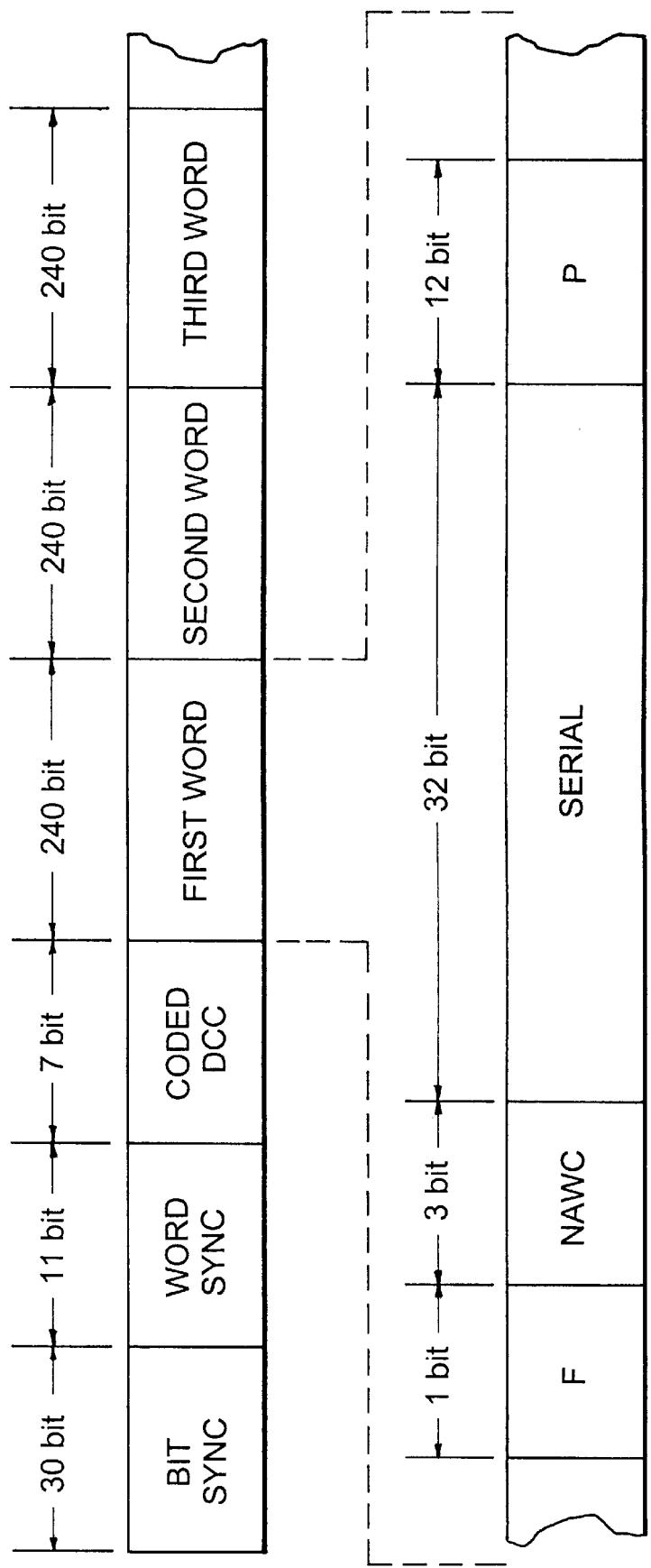
FIG. 6 illustrates the format of the incoming call response signal supplied by the portable telephone shown in FIG. 1.

Referring to FIG. 6, the format of an incoming call response signal conforming to TACS has a 30-bit bit synchronizing signal at its top. The incoming call response signal is provided with a 11-bit word synchronizing signal and a CODED DCC, which is a 7-bit control signal, following the bit synchronizing signal. The incoming call response signal further has a plurality of word signals following the CODED DCC. Each word signal consists of 240 bits and contains, for instance, the ID number of the telephone number of the portable telephone.

The first word signal contains a serial number word, whose leading one bit is a flag F for setting logical 0 if the word currently being received represents information following up an earlier received word, or logical 1 if it does not represent information following up any earlier received word. The serial number word is provided with, following the flag F, three NAWC bits indicating the number of words of the succeeding SERIAL and 32-bit SERIAL, which is followed by one parity bit P.

The SERIAL of the serial number word contained in the first word signal of the incoming call response signal contains the ID number of the portable telephone. One of the word signals contains aforementioned electrical field intensity detection signal. Although word signals also contain other kinds of information, their description is dispensed with here because they have no particular relevance to this embodiment.

The portable alerting unit 200 detects the first word signal of the incoming call response signal, then the serial number word contained in this first word signal, and further SERIAL. The portable alerting unit 200 compares the ID number of a portable telephone contained in SERIAL and the ID number of the portable telephone 100 to which it belongs, and detects the ID number of this portable telephone 100. The portable alerting unit 200, upon detection of the ID number of the portable telephone 100, performs call operation.

Next will be described a second preferred embodiment of the present invention.

While call operation is performed in the first embodiment as the portable alerting unit 200 detects the ID number of the portable telephone 100, to which it belongs, contained in an incoming call response signal transmitted by the portable telephone 100, call operation is performed in the second embodiment as the portable alerting unit 200 detects the ID number of the portable telephone 100, to which it belongs contained in an incoming call signal transmitted by a base station.

In the second embodiment, the synthesizer 208 of the portable alerting unit 200 controls the receiver 209 so that the antenna 202 can receive signals in the frequency band of the downlink incoming call channel of the portable telephone 100.

As all other operations of the portable alerting unit 200 are the same as those of the first embodiment charted in FIG. 5, their detailed description is dispensed with here.

Next will be described a third preferred embodiment.

In the format of the incoming call response signal conforming with TACS is illustrated in FIG. 6, its word signal contains, besides the aforementioned serial number word, a 48-bit abbreviated address word and a 48-bit extended address word. The abbreviated address word further contains 24-bit MIN1 and the extended address word, 10-bit MIN2. MIN1 contains the last six digits of the telephone number of the portable telephone 100 and MIN2, the first four digits of the telephone number of the portable telephone 100.

Therefore, the portable alerting unit 200, upon receiving an incoming call response signal from the portable telephone 100, detects the first word signal together with the extended address word and the abbreviated address word both contained in this first word signal. Then the portable alerting unit 200 detects MIN1 and MIN2 contained in the abbreviated address word and the extended address word, respectively, and the telephone number of the portable telephone 100 from MIN1 and MIN2. The portable alerting unit 200 performs call operation by detecting the telephone number of the portable telephone 100.

Next will be described a fourth preferred embodiment of the invention.

In the fourth embodiment, it is made possible, when the portable alerting unit 200 is set so as to perform call operation by detecting the ID number of the portable telephone 100, to alter the setting so as to cause the portable alerting unit 200 to perform call operation by detecting the telephone number of the portable telephone 100.

In this fourth embodiment, the memory 212 in the first embodiment illustrated in FIG. 3, which stores the ID number or the telephone number of the portable telephone 100, consists of an electrically erasable programmable read only memory (EEPROM).

The user of the portable telephone 100 and of the portable alerting unit 200 can, when the memory 212 stores the ID number of the portable telephone 100, rewrites it with a ROM writer to the telephone number of the portable telephone 100 or, when the memory 212 stores the telephone number of the portable telephone 100, rewrites it to the ID number of the portable telephone 100.

The comparator 211, when the content of the memory 212 is rewritten from the ID number to the telephone number of the portable telephone 100, detects the telephone number of the portable telephone 100 from MIN1 and MIN2 of the first word signal contained in an incoming call response signal transmitted by the portable telephone 100, and performs call operation. The comparator 211 on the other hand, when the content of the memory 212 is rewritten from the telephone number to the ID number of the portable telephone 100, detects the ID number of the portable telephone 100 from SERIAL of the first word signal contained in the incoming call response signal transmitted by the portable telephone 100, and performs call operation.

Although it was stated, with regard to the foregoing embodiments, that the unshown controller of the comparator 211, when the comparator 211 fails to detect the ID number of the portable telephone 100, switches the oscillation frequency of the synthesizer 208, the configuration may be so modified that, instead of providing the unshown controller in the comparator 211, the oscillation frequency of the synthesizer 208 be automatically changed at regular time intervals. This would simplify the configuration of the portable alerting unit 200, resulting in an advantage in cost performance.

As hitherto described, the present invention, which causes the portable alerting unit to detect either the ID number of the telephone number of the portable telephone, to which it belongs contained either in an incoming call response signal transmitted from the portable telephone or an incoming call signal from the base station, the portable telephone can alert a user to call arrival to it without having to add any special function or constituent element to the portable telephone.

Obviously, numerous additional modifications and variations of the invention are possible in light of the foregoing description. It is, therefore, to be understood that within the scope of the appended claims, the invention may be practiced otherwise than as specifically described herein.

What is claimed:

1. A portable alerting unit comprising:
   detecting means for detecting an incoming call response signal from a portable radio apparatus to a base station; said incoming call response signal notifying the base station of detection of an incoming call and being generated by the portable radio apparatus in response to an incoming call signal from the base station to the portable radio apparatus; and
   alerting means, responsive to a detection of said incoming call response signal and said incoming call signal, for notifying a user of said incoming call.

2. The portable alerting unit, as claimed in claim 1, further comprising:
   receiving means for receiving said incoming call response signal; and a synthesizer for varying the oscillation frequency of local signals to be supplied to said receiving means.

3. The portable alerting unit, as claimed in claim 2, wherein said synthesizer scans said frequency band at regular time intervals so that said receiving means can receive in a frequency band in which said portable radio apparatus can transmit incoming call response signal.

4. The portable alerting unit, as claimed in claim 3, wherein said detecting means comprises:
   a memory for storing said portable radio apparatus's own radio number; and
   a comparator for detecting a radio number contained in said incoming call response signal, and for comparing said detected radio number with the radio number in said memory.

5. The portable alerting unit, as claimed in claim 2, wherein said detecting means comprises:
   a memory for storing said portable radio apparatus's own identification (ID) number; and
   a comparator for detecting an ID number contained in said incoming call response signal and for comparing said detected ID number with the ID number in said memory.

6. The portable alerting unit, as claimed in claim 5 or 4, wherein said memory comprises an EEPROM.

7. The portable alerting unit, as claimed in claim 2, wherein said alerting means comprises:
   a loudspeaker;
   an LED; and
   a vibrator.

8. The portable alerting unit, as claimed in claim 7, further comprising selector means for setting or resetting said loudspeaker, said LED and said vibrator.

9. A portable alerting unit comprising:
   detecting means for detecting an incoming call signal transmitted by radio on an incoming call channel from a base station to a portable telephone for indicating receipt of a incoming call, and an incoming call response signal from said portable telephone to said base station; said incoming call response signal indicating detection of the incoming call signal from said base station and being generated by said portable telephone in response to said incoming call signal from said base station to said portable telephone; and
   alerting means, responsive to a detection of said incoming call signal and said incoming response call signal, for notifying a user of said incoming call.

10. The portable alerting unit, as claimed in claim 9, further comprising:
   receiving means for receiving said incoming call signal; and
   a synthesizer for varying the oscillator frequency of local signals to be supplied to said receiving means.

11. The portable alerting unit, as claimed in claim 10, wherein said synthesizer scans said frequency band at regular time intervals so that said receiving means can receive in a frequency band of an incoming call channel to which said portable radio apparatus can be connected.

12. The portable alerting unit, as claimed in claim 9, wherein said detecting means comprises:

a memory for storing said portable radio apparatus's own identification (ID) number; and
a comparator for detecting a ID number contained in said incoming call response signal and for comparing said detected ID number with the ID number in said memory.

13. The portable alerting unit, as claimed in claim 9, wherein said detecting means comprises:
   a memory for storing said portable radio apparatus's own radio number; and
   a comparator for detecting a radio number contained in said incoming call signal and for comparing said detected radio number with the radio number in said memory.

14. The portable alerting unit, as claimed in claim 12 or 13, wherein said memory consists of an EEPROM.

15. The portable alerting unit, as claimed in claim 9, wherein said alerting means comprises:
   a loudspeaker;
   an LED; and
   a vibrator.

16. The portable alerting unit, as claimed in claim 15, further comprising selector means for setting or resetting said loudspeaker, said LED and said vibrator.

17. A portable alerting unit, provided independent of a portable radio apparatus, for notifying the user of an incoming call from a base station to said portable radio apparatus, wherein
   said portable radio apparatus comprises:
      detecting means for detecting an incoming call signal from said base station,
      transmitting means for transmitting, in response to detecting said incoming call signal, an incoming call response signal to said base station for notifying said base station of the detection of said incoming call signal received from said base station, and
   said portable alerting unit comprises:
      receiving means for receiving said incoming call signal and said incoming call response signal, and
      notifying means, responsive to reception by said receiving means of either said incoming call signal or said incoming call response signal, for notifying the user of said incoming call from said base station to said portable radio apparatus.

18. The portable alerting unit, as claimed in claim 17, wherein said portable radio apparatus comprises detecting means for detecting, after detecting said incoming call signal, the receive electrical field intensity.

19. A portable alerting unit comprising:
   detecting means for detecting an incoming call response signal from a portable radio apparatus to a base station; said incoming call response signal notifying the base station of detection of an incoming call and not including a message indicative of an absence of a called party; and
   alerting means, responsive to a detection of said incoming call response signal, for notifying a user of said incoming call.

* * * * *